Jan. 30, 1962   M. J. KRAMER   3,019,373
DIFFERENTIAL DIRECT CURRENT RESPONSIVE CONTROL SYSTEM
Filed Jan. 2, 1959
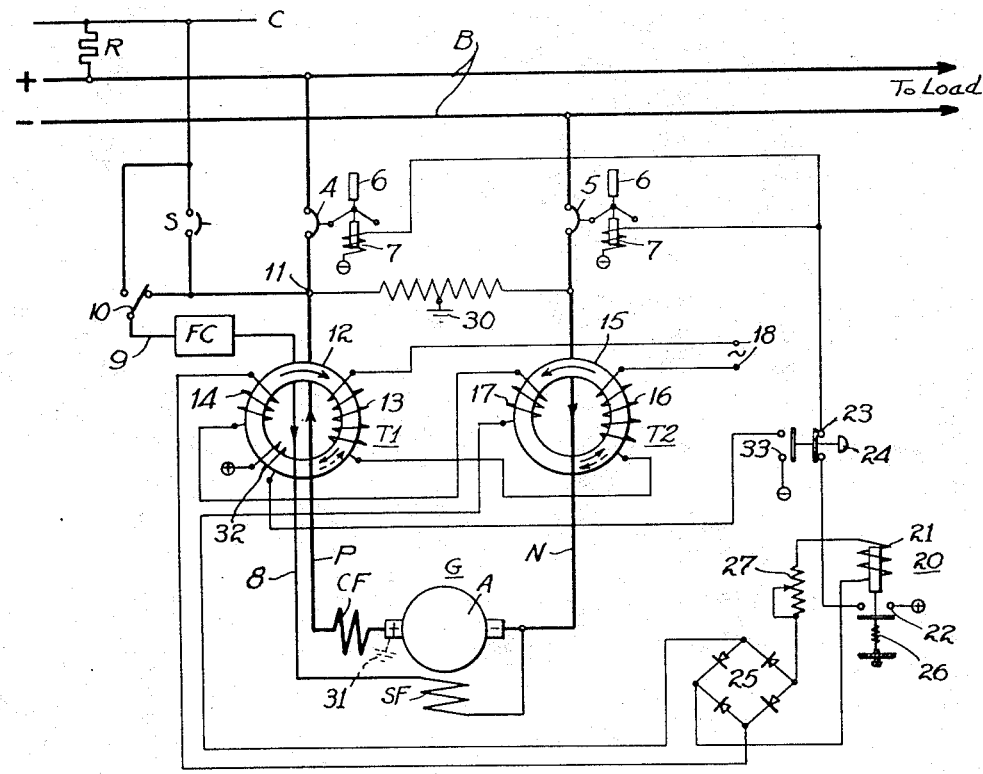
*Fig. I.*
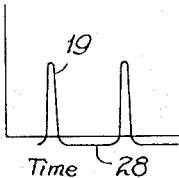
*Fig. 2.*
INVENTOR
*Max J. Kramer*
BY
*Howard B. Funk*
ATTORNEY

United States Patent Office 3,019,373
Patented Jan. 30, 1962

3,019,373
DIFFERENTIAL DIRECT CURRENT RESPONSIVE CONTROL SYSTEM
Max J. Kramer, Parma, Ohio, assignor to Aluminum Company of America, Pittsburgh, Pa., a corporation of Pennsylvania
Filed Jan. 2, 1959, Ser. No. 784,779
1 Claim. (Cl. 317—13)

This invention relates to electrical control apparatus and more particularly to differential current responsive control apparatus for direct current power equipment, such as generators, motors, rectifiers and the like.

In general, it is an object of the invention to provide a reliable, simple and effective apparatus for continuously comparing the magnitudes of two equal direct currents and in the event of the development of a predetermined percentage difference between them effecting a control operation adapted either to bring the currents back into equality, or to discontinue the current flow completely.

Another object of the invention is to provide a simplified electromagnetic transductor arrangement for affording differential current protection to a selected component of a direct current power system.

Another object of the invention resides in the provision of a fault protection system for direct current equipment in which two magnetically saturated cores having superimposed A.C. excitation are employed to render the system highly sensitive to any unbalanced current condition that may develop in the operation of the D.C. equipment.

Still another object of the invention is to provide a fault detector for protecting direct current equipment against the effects of ground faults and the like which is highly sensitive in operation to low current faults, which is sensitive to any developing fault that has a long-time buildup, as well as to any suddenly occurring fault, which detector has long service life with little need for maintenance and which incorporates simple means for testing the same at any time without interrupting or interfering with the normal operation of the power equipment.

Other objects and advantages will become apparent and the invention itself will be readily understood upon consideration of the following detailed specification taken in conjunction with the accompanying drawing, wherein:

FIG. 1 is an electrical schematic diagram of elements and circuits of a preferred embodiment of the invention as employed for providing fault protection for a generator in a direct current power system, and FIG. 2 is a graph representing the alternating current wave shape developed in the operation of the protective apparatus of FIG. 1.

In accordance with my invention, two electromagnetic transductors, each comprising a closed core of rectangular-hysteresis-loop magnetic material carrying a primary winding and an output winding, are utilized as a direct current power circuit differential current detector. The transductors are inductively coupled to the power circuit by encircling preselected points thereof, and their cores are magnetically saturated by the D.C. excitation thus provided. The primary windings are connected to an A.C. supply source, polarity-wise in a sense to oppose the D.C. excitation on both cores and drive them out of saturation during the same half of the A.C. cycle and let them go back into saturation during the other half cycle. Responsively thereto, normally equal alternating voltages are induced in the output windings for the normal balanced D.C. excitation on the cores. These windings are connected series opposed in circuit with a bridge rectifier and a control relay, so normally the voltage across them is zero and the relay remains inactive. However, in response to unbalanced D.C. excitation, the cores cause the induced voltages to change with respect to each other, so they cannot cancel and a net output voltage appears across the seried output windings for actuating the relay when the output voltage reaches a predetermined magnitude. By operating the transductors in this saturated mode, extreme sensitivity is achieved for very small current differences in D.C. power circuits of both low and reasonably high load current ranges.

While the invention will be described particularly for affording differential current protection to a generator, it will be understood that the disclosure in this respect is merely illustrative, since it will be apparent to those skilled in the art that the invention is applicable to other direct current power circuits and equipment.

Referring to FIG. 1, there is shown a direct current generator G which in a typical D.C. power system may be driven by any suitable prime mover (not shown) and operated in parallel with additional generators in a manner well known in the art to supply power at medium voltage and high amperage to a feeder or distribution bus B by which the power is delivered to a suitable load (not shown), such as an electrolytic cell line for aluminum production. As is well known, the generator may be driven by a gas engine and operated as a motor for starting the engine. Generator G has an armature A, a compensating field winding CF and a shunt field winding SF. The positive and negative terminals of the generator armature are adapted to be connected by conductors or cables P and N to the positive and negative conductor bars, respectively, of the bus B through circuit breakers 4 and 5. These circuit breakers may each have a closing solenoid 6 and a tripping solenoid 7 arranged to be energized by any conventional means (not shown) when it is desired to put the generator into service or take it out of service. A starting bus C connected to the positive conductor of bus B through a current limiting resistor R is provided in the exemplary system herein disclosed. The field winding CF is in series with the armature, to carry armature current. The shunt field winding SF has one end connected to the negative armature terminal and its other end connected by lead 8 to a field controller FC which may be a customary field adjusting rheostat or other conventional generator voltage control mechanism. A lead 9 connects the field controller to a suitable field transfer switch 10 by which the field circuit may be completed to the starting bus C when starting the generator as a motor after which it is completed to conductor P on the generator side of the circuit breaker 4, as shown at 11, to allow self-excited generation. A starting switch S is adapted to connect the positive side of the armature to the starting bus C, to allow the generator to run as a motor until its prime mover can take over.

In the typical case above described, only so much of the generator as is needed to explain the present invention has been mentioned and illustrated, conventional equalizer circuit for parallel generator operation and overvoltage protection devices customarily employed having been omitted in order to avoid cluttering the illustration and description, as they form no part of the instant invention.

In case of a fault or ground trouble developing on generator G or its shunt field circuit, it is desired to take it out of service when the magnitude of the fault current reaches a predetermined value, as low as 0.1% of the normal load current. According to the invention, the D.C. amperes in the two conductors P and N are continuously compared by two transductors T1 and T2 which are inductively coupled to such conductors on the generator side of the circuit breakers 4 and 5. Of course, it is necessary to have a grounded point in the power circuit, other than a fault ground. In the case of an ungrounded circuit, a ground is provided which may be located as shown at 30, the midpoint of moderately high resistance connected across the P and N conductors between the transductors T1 and T2.

Transductor T1, as shown, comprises a closed magnetic core 12 of high-permeability or rectangular-hysteresis-loop material, such as Orthonol, and of toroid form through the open center of which the direct current conductor P extends to constitute a one turn control winding. A primary A.C. winding 13 and a secondary or output winding 14 of a lesser number of turns, a turn ratio of between about two and five-to-one being adequate, are distributively wound on core 12 (the distributed form of the windings not being shown, in order to simplify the drawing and avoid confusion). A 500 turn primary and a 200 turn secondary have been found to be quite satisfactory, but this is merely an example. It is preferred for ease of construction and operating efficiency that the output winding 14 be wound over, or on the outside of, the primary winding 13. Transductor T2 duplicates transductor T1 as closely as manufacturing facilities permit, 15 indicating its core, 16 its primary winding and 17 its output winding. Conductor N extends through core 15 and thus serves as a one turn control winding.

Energy for the two primary windings 13 and 16 is derived from an alternating current source 18 of suitable voltage and frequency, to which the windings are connected either in parallel or series circuit relation. The series connection is preferred as it has the advantage of reducing the peak of the current pulses 19, shown in FIG. 2, to substantially half that which would occur with a parallel connection for the windings.

The secondary windings 14 and 17 are adapted to work in opposition and effect operation of a suitable electro-responsive relay device for control purposes in the event a predetermined percentage difference develops between the direct currents being measured and compared. In the control and protective arrangement illustrated in the drawing for generator G, the windings 14 and 17 are connected in series opposition in an output circuit which includes a bridge-type full wave rectifier 25 and the operating coil 20 of a control relay 21. Contacts 22 of this relay are closed when the relay is energized or operated and complete an obvious energizing circuit for the trip coils 7 of the circuit breakers 4 and 5, which circuit may include normally closed contacts 23 of a pushbutton test switch 24, to be later referred to, if desired. For sensitivity adjustment, the pull-up voltage required to operate the relay may be varied by adjusting its retraction spring 26, or by using a voltage adjusting resistor 27 in the circuit of relay coil 20.

It is necessary that the two transductors work in the same sense, rather than in opposition. In the present instance, therefore, the primary windings 13 and 16 are connected in reverse polarity relation with respect to each other, so as to conform them to the reverse polarity relation of the D.C. input windings constituted by the conductors P and N. Thereby, the relation of the D.C. and A.C. fluxes to each other is the same in the two cores 12 and 15 at any instant of the alternating current cycle. This is indicated by the arrows marked on the respective cores, the long arrows indicating the direction of the D.C. flux and the short solid and dotted arrows indicating the A.C. flux directions for each half of the alternating current cycle, respectively. It is to be seen that in each core the A.C. flux bucks or opposes the D.C. flux during the same half of the A.C. cycle.

In the present instance, generator G may be operated as a motor to start its gas engine prime mover by opening breaker 4, closing breaker 5, moving transfer switch 10 to the left, thereby disconnecting the positive side of the shunt field from positive conductor P and connecting it to the starting bus C, and closing starting switch S so as to connect the positive side of the armature to the starting bus C. Since the negative side of the shunt field is connected directly to the negative generator terminal, the negative conductor N carries armature current and shunt field current, while the positive conductor P carries only armature current. Therefore, during operation of the generator as a motor, the currents in the positive and negative conductors P and N are not equal and a differential tripping of the circuit breakers 4 and 5 would occur. To prevent this, the shunt field wire 8 is passed through toroid 12 for flow of the field current in the same direction as the armature current flow in conductor P. This renders the magnetizing force on core 12 equal to that on core 15. When the generator is rotating at proper speed and the prime mover takes over, starting switch S is opened and field or transfer switch 10 is quickly thrown to the right. With circuit breaker 4 remaining open, it is seen that the shunt field current threading toroid 12 is cancelled, which is necesesary for balance, since there is yet no direct current in conductor N passing through toroid 15. This balanced D.C. condition is retained upon closing circuit breaker 4 and loading the generator. Thus, as the generator puts out load current, the D.C. in conductor P is load current plus field current, and the effect of the field current on toroid 12 is cancelled out by field current flowing in lead 8 in a direction the reverse of the direction of current flow in conductor P. Thereby, the D.C. currents threading the two toroids 12 and 15 are equal.

In operation, whenever generator G is being operated either as a motor or as a generator, each of the cores 12 and 15 will be subjected to D.C. excitation or magnetizing force in ampere turns determined by the value of the direct current flowing in the conductor or conductors it encircles. Hence, under normal or balanced direct current conditions, the D.C. excitation applied to the cores will be equal or balanced and will remain so throughout any direct current load changes. In other words, swings in load current traversing the D.C. conductors or input windings do not disturb the balances D.C. excitation of the two cores. The cores are saturated by the D.C. excitation, and the superimposed A.C. excitation alternately aids and opposes the D.C. excitation, thereby reducing the core flux and driving them a predetermined amount away from or out of saturation during the half of the alternating current cycle in which the A.C. excitation opposes the D.C. excitation and letting them go back into saturation during the other half cycle. Thereby, the alternating current flowing in each winding 13 and 16 is forced to take a distorted or non-sinusoidal wave shape substantially as depicted in FIG. 2. It shows the alternating current to be of sharply peaked form at 19 for alternate half cycles and of shallow generally rectangular form at 28 for the intervening half cycles. These positive and negative current pulses are equal in average value, and their average value will be proportional to the direct current flowing in the conductor or conductors each core encircles. Responsively to the cyclic flux excursions thus effected in both cores, normally equal alternating voltages are induced in the output windings 14 and 17. Being connected in opposition, these voltages cancel and the net voltage across the seried windings is zero, so that the control relay 21 remains inactive for balanced direct current input to the two transductors.

However, if a fault should occur, such as grounding of the armature circuit or field circuit of the generator G, or progressive insulation break-down, such as would cause either a slow or a rapid current unbalance, of either a suddenly high or a progressively increasing magnitude, the D.C. excitation of the two cores will become unbalanced by the amount of fault current.

For any unbalance in D.C. excitation, unequal flux reactions occur in the respective cores and cause the voltage induced in one of the output windings 14 and 17 to change with respect to the voltage induced in the other of the output windings, whereupon a differential or net output voltage will appear across these windings to cause operation of the relay 21 when it rises to the pick-up voltage of the relay. In case a fault should occur and produce a large D.C. unbalance between conductors P and N, as by grounding of the generator armature as at 31 for instance, load current in conductor P drops by the amount of the fault current by-passing transductor T1 and the normal D.C. flux balance of the two cores is upset. Responsively thereto, the differential or net output voltage abruptly appears, in this case, across the output windings. The output current due to this voltage picks up relay 21, whereby closure of its contacts 22 causes tripping of the circuit breakers 4 and 5 to disconnect the generator from the bus and remove excitation from the generator. If desired, the relay may be used to actuate any suitable signal or alarm to indicate that the generator has been disconnected.

Suppose, as an example of a small D.C. unbalance, that leakage current normally present in the generator should progressively increase or creep up to a harmful value over a long period of time, the D.C. excitation unbalance will likewise progressively increase with the development of a differential or net output voltage from the transductors at a correspondingly slow rate. When this net output voltage reaches the preset value required to pick-up the relay 21, the relay operates to trip the circuit breakers.

It has been found that the differential system is extremely sensitive. Normally, the output energy to the control relay will be zero for a no-fault condition, since the direct current magnetomotive force on the respective toroids will be balanced. Should any fault develop and cause a direct current unbalance, even as low as 0.1% of the normal load current, such as 3 amperes in 3000, for example, it causes the cores to produce a net output voltage and current flow in the output circuit to relay 21 sufficient to make it operate and trip out the circuit breaker. However, the system is usually set to operate at a higher percentage of unbalance to avoid unnecessary trip-out at low differential current levels.

The differential system is static and rugged, and has the further advantage that it may easily be tested at any time without interrupting service of the equipment it is protecting. For test purposes, a coil or winding 32, suitably of one or two turns, is provided on either of the cores and one end thereof connected to one of the contacts 33 of push switch 24. A small battery (not shown) may be connected to the other end of coil 32 and to the other contact 33, as indicated by the + and − symbols, at testing time. Depressing test switch 24 opens the circuit to the trip coils 7 and applies battery current to the test coil 32. Test current of either polarity will unbalance the D.C. excitation of the cores and cause sufficient voltage to appear in the output circuit to energize relay 21. However, the test can be effected at a time the generator is to be taken out of service, in which case the push button need not be used, but the battery connected directly to the test coil terminals, thereby including breaker operation in the test.

Although having been described in connection with D.C. generator G, it will be understood that the invention is not limited to this specific situation. It is applicable to D.C. motors and other direct current equipment and circuits which are to be protected against ground faults and the like whether or not a dynamoelectric machine operating as a motor or a generator is involved. It may be used to advantage for speed or current regulation purposes for paralleled dynamoelectric machines, as will be readily appreciated by one skilled in the art. Hence, it is to be understood that the detailed disclosure of the invention is for understanding and illustration of the nature thereof and that such changes and modifications as may be needed to adapt it to various control and protection uses will be apparent to those skilled in the art and may be made without departing from the spirit and scope of the invention as defined in the appended claim.

What is claimed is:

In combination, a D.C. generator adapted to be driven by a gas engine and having positive and negative output conductors connected through individual circuit breakers to a power distribution bus and a shunt field circuit including a field adjusting rheostat connected at its negative end to the negative generator terminal and at its positive end to the circuit breaker end of said positive output conductor, the positive breaker being open and the negative breaker closed to set up said generator for starting as a motor, switch means in shunt relation to said positive breaker and operable to connect said positive end of said field circuit and said positive conductor respectively to the positive side of said bus through current limiting resistance for generator start as a motor after which said switch means is opened and said positive breaker closed for connecting said generator directly across said bus, and fault protection means for said generator comprising two closed toroid cores of rectangular-hysteresis-loop magnetic material, each encircling one of said output conductors intermediate said generator and said circuit breakers and being magnetically saturated by the D.C. excitation provided by the current flow in the conductor it encircles, said field circuit having its positive current lead extending back through the positive conductor core to render the D.C. excitation on this core equal to that on the negative conductor core, a primary winding and an output winding of a lesser number of turns distributively wound on each core, an alternating current source to which said primary windings are connected in series and in such polarity relation with respect to each other that both cores are driven out of saturation during the same half of the A.C. cycle responsively to which alternating voltages are induced in said output windings, said output windings being connected in series opposition and having equal voltages induced therein which cancel and provide zero voltage thereacross for balanced D.C. excitation of said cores, said cores being responsive to unbalanced D.C. excitation to produce a net output voltage across said output windings, a control relay having a winding connected in circuit with said output windings through a full wave bridge rectifier, and trip means for each of said circuit breakers and controlled by said relay for tripping both circuit breakers responsively to said net output voltage reaching a predetermined magnitude.

References Cited in the file of this patent
UNITED STATES PATENTS

| 2,666,872 | Austin | Jan. 19, 1954 |
| 2,676,284 | Bechberger | Apr. 20, 1954 |
| 2,740,088 | Roberts | Mar. 27, 1956 |
| 2,821,666 | Austin | Jan. 28, 1958 |
| 2,838,688 | Loewe | June 10, 1958 |
| 2,924,753 | Smith | Feb. 9, 1960 |

OTHER REFERENCES

William A. Geyger: "Magnetic-Amplifier Circuits," pages 29–40.

George M. Ettinger: "Magnetic Amplifiers," pages 17–23.